UNITED STATES PATENT OFFICE.

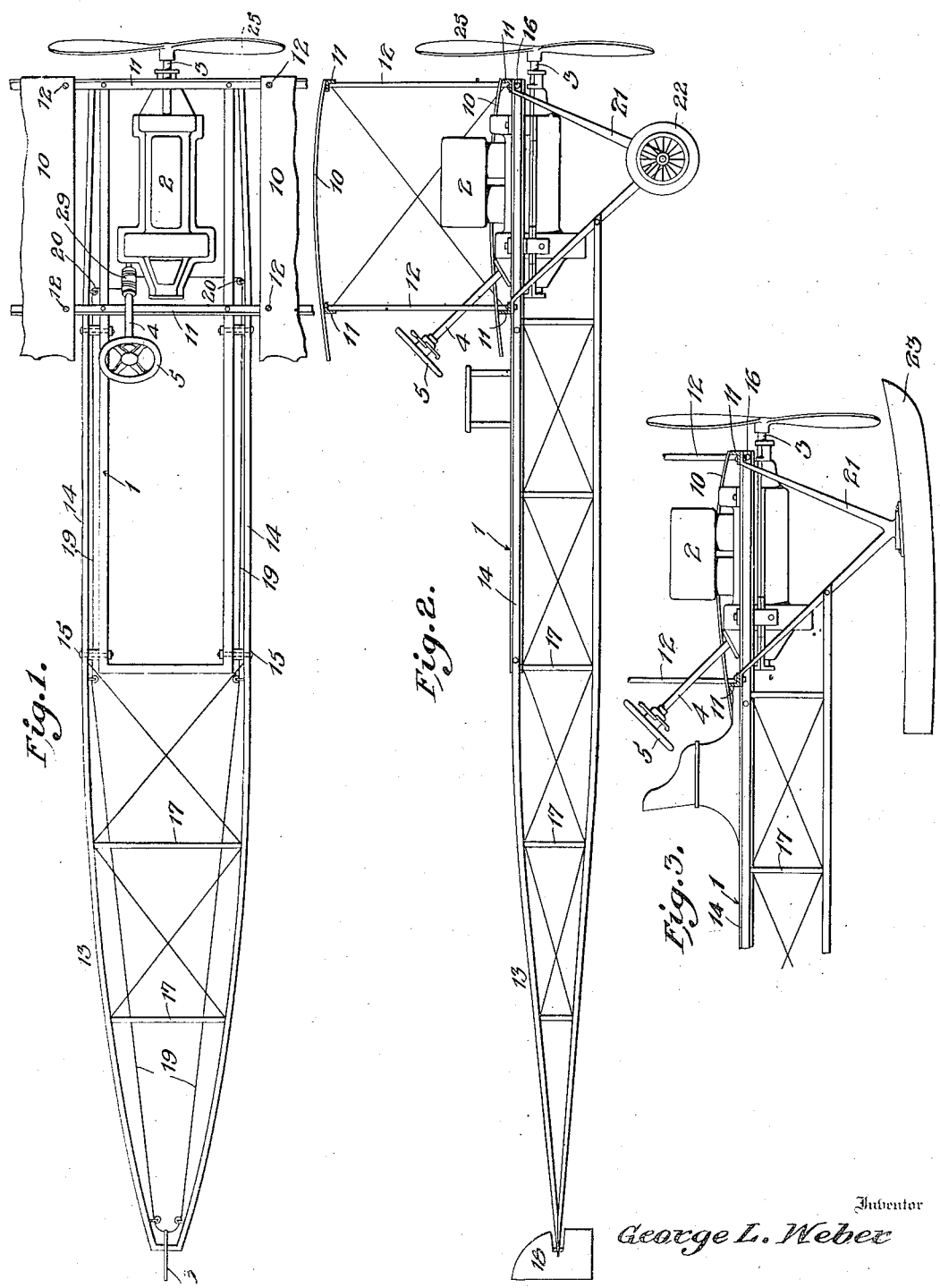

GEORGE LOUIS WEBER, OF PHILADELPHIA, PENNSYLVANIA.

FLYING-MACHINE FRAME.

1,274,963.  Specification of Letters Patent.  Patented Aug. 6, 1918.

Application filed September 30, 1916. Serial No. 123,150.

*To all whom it may concern:*

Be it known that I, GEORGE L. WEBER, a citizen of the United States, residing at Philadelphia, in the county of Philadelphia and State of Pennsylvania, have invented certain new and useful Improvements in Flying-Machine Frames; and I do hereby declare the following to be a full, clear, and exact description of the invention, such as will enable others skilled in the art to which it appertains to make and use the same.

This invention relates to aeronautics, and more especially to flying machines; and the object of the same is to produce a machine whose plane frame and tail frame are capable of being mounted on the chassis of a pleasure automobile of standard type (such as a Ford as herein illustrated) and whose landing frame, whether it carry wheels or pontoons, is connected with the plane frame so that the former receives whatever shocks are occasioned in landing.

I do not wish to be confined strictly to the structure of the various frames as shown herein, because it may be modified according to the type of aeroplane or hydroplane employed or it may necessarily be modified according to the type of chassis onto which it is to be fitted; and obviously the details of the flying machine as carried by the several frames thereof constitute no part of the present invention. The latter is therefore described below in rather broad language, and reference is made to the accompanying drawings in which:

Figure 1 is a plan view and Fig. 2 is a side elevation partly in section showing this invention as applied to the chassis of a Ford automobile, such chassis and the engine and steering post being more lightly shaded in the drawings than the remaining parts, and Fig. 3 is a side elevation of the forward portion of the structure shown in Fig. 2, pontoons being substituted for the wheels in the landing frame and the Ford seat being here used.

In the drawings the numeral 1 designates the frame or chassis of a light-weight automobile, 2 is its engine, 3 is the front end of the engine shaft, 4 is the steering pillar, and 5 is the steering wheel. The control levers and other details of the ordinary pleasure automobile are employed but are not here illustrated. In other words, I have removed both axles and all wheels and fenders, and even the drive shaft or connection from the engine shaft to the driving wheels. In Figs. 1 and 2 I have removed all parts of the body or superstructure, although I may retain the seats as indicated in Fig. 3.

The numeral 10 designates the framework for the plane or planes of the flying machine, the same being broken away in Fig. 1 and shown in Fig. 2 in the shape of four angle irons, two of which numbered 11 pass across and are secured to the chassis frame by bolts or otherwise. Suitable wires or rods 12 connect these angle irons, and this frame carries the planes and wings as usual and not thought necessary to illustrate in detail.

The numeral 13 designates the tail frame whose side bars 14 pass alongside the side bars of the chassis 1 and are secured thereto at suitable points as by bolts 15 at the rear end of the chassis and perhaps by others 16 at its front end. Any proper type of braces 17 may be employed in this frame, and any suitable type of rudder 18. Cords or wires 19 lead from the rudder forward within the tail frame over suitable guides, around pulleys 20, and are wound in opposite directions on a drum 29 fast on the steering shaft, and therefore when this is turned by means of wheel 5 the flying machine is steered. I have not thought necessary to illustrate the other rudder and the mechanism for manipulating it, because it has no connection with the automobile structure and no novelty is claimed for it.

The numeral 21 designates the landing frame which as shown herein is connected to the lowermost angle irons 11 of the plane frame rather than being connected directly with the chassis. If the machine be an aeroplane, this plane will carry wheels 22—if it be a hydroplane, this frame will carry pontoons 23 as seen in Fig. 3.

In applying a structure of this kind to an automobile stripped as above described, probably the side bars of the tail frame will first be passed astride the side bars of the chassis and bolted thereto; then the plane frame with the landing frame attached will be brought into a position at right angles to the length of the tail frame about as indicated in Fig. 2, and its lower bars or angle irons 11 bolted to the chassis or to the side bars of the tail frame already in place. The wheels 22 or pontoons 23 can then be applied, and finally the propeller 25 is attached to the front end 3 of the engine shaft, and the machine is ready for use.

What I claim is:

1. In a flying machine structure, the combination with an automobile chassis including a rectangular frame and engine; of a tail frame whose side bars are connected with the side bars of the rectangular frame and extend to the front end of said chassis frame, a plane frame whose lower bars are transversely mounted on and connected with said chassis, and a landing frame carried by and depending from the plane frame.

2. In a flying machine structure, the combination with an automobile chassis including a rectangular frame, an engine, and steering pillar; of a tail frame whose side bars extend parallel to and are connected with the side bars of the chassis frame, a rudder in this frame, flexible connections between the rudder and the steering shaft of said pillar, a plane frame whose lower bars are transversely disposed on and connected with said chassis frame, and a landing frame carried by and depending from the plane frame.

3. In a flying machine, the combination with an automobile chassis, its engine, a propeller carried by the engine shaft, and the seats and steering mechanism, said chassis including a frame having side bars, of a tail frame whose side bars extend in juxtaposition to and along those of said chassis and are secured thereto, a rudder in this frame, connections between it and said steering mechanism, a transverse plane frame whose bars are mounted upon and also secured to said chassis bars, and a landing frame.

4. A flying machine composed of primary unit sections, consisting respectively of an automobile chassis unit having side bars and provided with a motor and steering gear; a main plane frame unit having front and rear beams or bars adapted to be transversely disposed upon and secured to said chassis frame; a tail frame unit having side bars adapted to be disposed along the chassis side bars and secured thereto; and a landing frame unit adapted to be secured to the said main plane unit.

In testimony whereof I affix my signature in presence of two witnesses.

GEORGE LOUIS WEBER.

Witnesses:
WILLIAM H. F. WARD,
A. L. WARD.